Jan. 12, 1965    B. BERNSTEIN    3,165,678
FLAT RECTIFIER STACK
Filed June 4, 1962    2 Sheets-Sheet 2
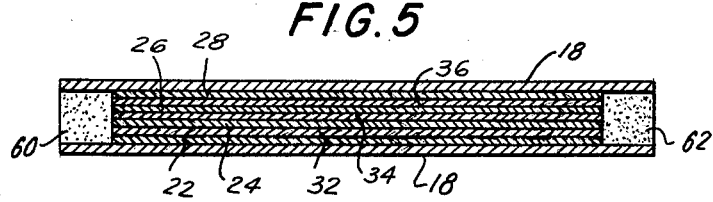
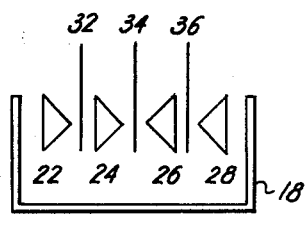
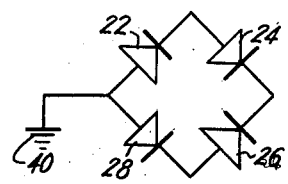
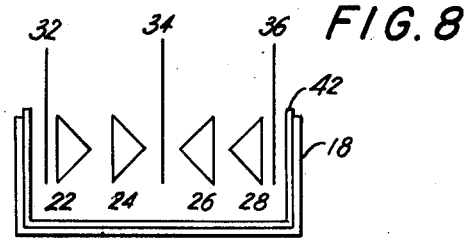
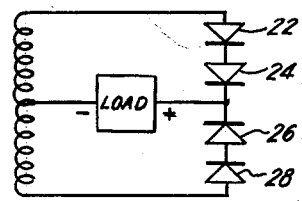
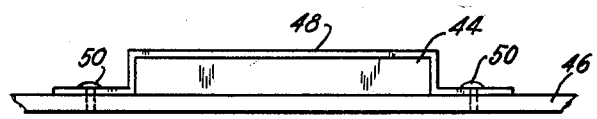
INVENTOR.
BERNARD BERNSTEIN
BY James and Franklin
ATTORNEYS

United States Patent Office 3,165,678
Patented Jan. 12, 1965

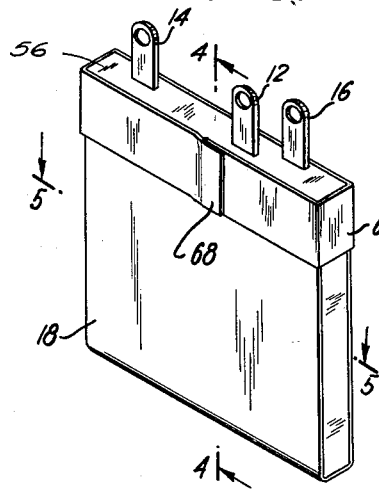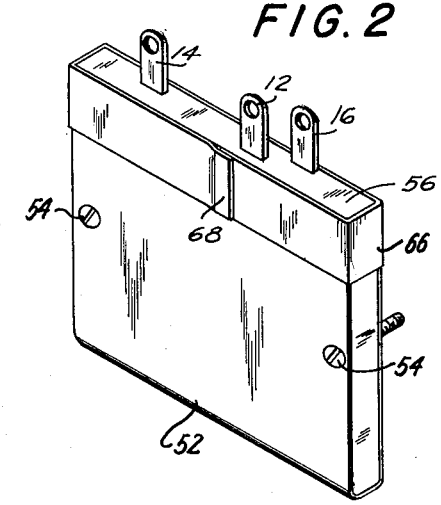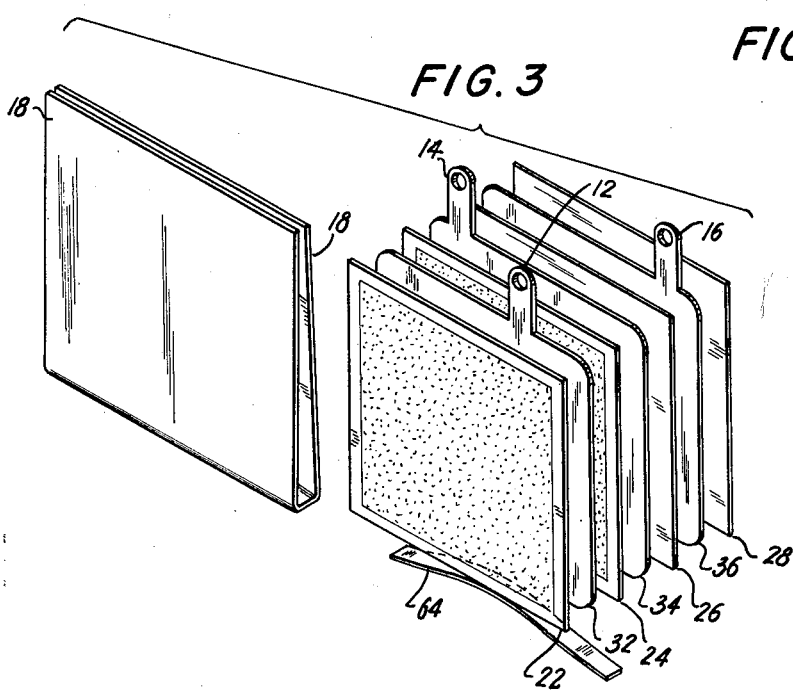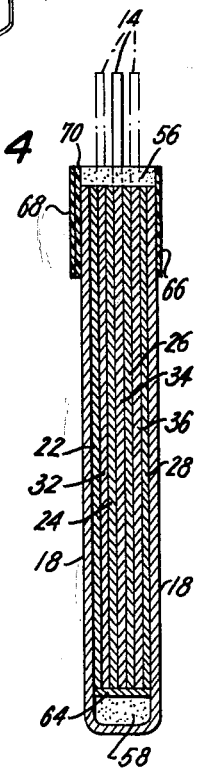

3,165,678
FLAT RECTIFIER STACK
Bernard Bernstein, Brooklyn, N.Y., assignor to General Instrument Corporation, Newark, N.J., a corporation of New Jersey
Filed June 4, 1962, Ser. No. 199,918
5 Claims. (Cl. 317—234)

This invention relates to rectifiers, especially selenium rectifiers, and more particularly to such rectifiers arranged in a flat compact structure.

The primary object of the present invention is to generally improve rectifiers of the selenium type, used widely for battery charging and many other purposes. A more specific object is to provide such a rectifier which is unusually compact and space saving; which is relatively immune to atmospheric conditions and vibrations; which is made of comparatively few simple flat parts which may be stamped from sheet material; which requires no three-dimensional molding of plastic spacers or other such parts; and which consequently is inexpensive to manufacture.

To accomplish the foregoing general objects, and other more specific objects which will hereinafter appear, my invention resides in the rectifier assembly, and the elements thereof and their relation one to another, as are hereinafter more particularly described in the following specification. The specification is accompanied by drawings in which:

FIG. 1 is a perspective view showing a flat rectifier stack embodying features of the invention;

FIG. 2 is a similar view showing a modification;

FIG. 3 is a perspective view showing most of the parts of the stack in disassembled relation;

FIG. 4 is a transverse section drawn to larger scale, taken approximately in the plane of the line 4—4 of FIG. 1;

FIG. 5 is a horizontal section taken approximately in the plane of the line 5—5 of FIG. 1;

FIG. 6 is a diagrammatic view explanatory of the arrangement of the cells and plates for a full wave rectifier of the bridge type.

FIG. 7 is a wiring diagram of the parts shown in FIG. 6;

FIG. 8 is a diagrammatic view explanatory of the arrangement of cells and plates for a center tap rectifier;

FIG. 9 is a wiring diagram of the parts shown in FIG. 8; and

FIG. 10 shows how the rectifier stack of FIG. 1 may be clamped against a metal chassis or other structure to act as a heat sink.

Referring to the drawing, and more particularly to FIG. 1, I there show a flat rectifier stack with three soldering lugs 12, 14 and 16. The flat sides 18 of the outer case are also metal, and in some wiring arrangements may be used as a fourth terminal, usually a grounded terminal.

Referring now to FIG. 3, the rectifier stack is made up of flat selenium cells 22, 24, 26 and 28. The soldering lugs previously referred to are formed integrally with metal terminal plates 32, 34, 36. The cells and plates are stacked directly together in face-to-face relation as is better shown in FIGS. 4 and 5, and are received between the sides 18 of a sheet metal case or housing.

The cells and plates may be used in different arrangements, and two typical and common arrangements may be more specifically described. In FIG. 7 there are four rectifiers arranged in the form of a bridge for full wave rectification. The rectifiers are marked 22 through 28, and correspond to the four flat selenium cells shown in FIG. 3. The physical arrangement is schematically shown in FIG. 6, in which it will be seen that the three terminal plates 32, 34 and 36 are distributed between the four cells 22, 24, 26 and 28, and further that two of the cells, 22 and 24, face in one direction, and the other two, 26 and 28, face in opposite direction. The outside case 18 contacts the outer two cells 22 and 28, and acts as a common ground connection. This is the ground connection shown at 40 in FIG. 7. It will be seen that no wiring or soldering is needed to form the desired bridge circuit.

A center tap rectifier arrangement is shown in FIG. 9. Here again two of the cells, 22 and 24, face in one direction, and the other two, 26 and 28, face in opposite direction. There are three external leads, two at the outside and one at the center.

Referring now to FIG. 8, in this case the terminal plate 34 remains at the center between the two metal cells 24 and 26. The terminal plate 32 is at the outside of cell 22, and the terminal plate 36 is at the outside of the cell 28. This provides the three external connections needed, and the outside case 18 forms no part of the circuit. Indeed it must be insulated from the outer cells, and a lining 42 of insulation is employed. This may be sheet fibre insulation or other suitable insulating material in sheet form.

In either case the resulting structure is very compact because there is no attempt to provide air circulation or air cooling around the cells. Instead reliance is had on good heat conductivity through the cells, the plates and the case, and thence to a larger metal area acting as a heat sink. Typically, the flat rectifier stack may be secured directly on a metal chassis or the like. This is shown in FIG. 10, in which a rectifier stack generally designated 44 is secured flat against a metal chassis 46 by means of a clamp 48 secured to the chassis by appropriate screws or other fastening means 50. Instead of using an outside clamp like that shown in FIG. 10, the case itself may be enlarged somewhat to receive mounting screws. This is illustrated in FIG. 2, in which the outer case 52 is about a half inch wider than that shown in FIG. 1. The excess width at the edges is provided with holes to receive mounting screws 54, which may be screwed into a metal frame or chassis such as that shown at 46 in FIG. 10. In either case, for maximum rating, it is important to provide a heat sink of adequate size.

Considering one particular form of the rectifier assembly in greater detail, the cells 22, 24, 26 and 28 (FIG. 3) preferably are flat approximately square selenium cells, each having a selenium coating on a sheet of aluminum. The terminal plates 32, 34 and 36 preferably are made of flat brass, and the soldering lugs are integral with the plates and project upwardly from the upper edge. It will be understood that the term "upper" is here used merely for convenience, and that in practise the rectifier may be mounted in any desired position. For convenience the terminology assumes the orientation shown in FIGS. 1-4 of the drawing.

The terminal plates preferably are rounded at the corners, as shown in FIG. 3, but otherwise have an area substantially the same as that of the cells. It is preferred to round the corners in order to guard against possible contact of a corner with the exposed corner of an adjacent aluminum sheet on which the selenium material is coated. This could happen if a corner of the plate or cell were slightly bent, and would result in short circuiting a rectifier element, because the selenium film is thin, and may be penetrated by a sharp corner.

The outer case 18 is inexpensively formed out of sheet metal, and is bent to U shape in cross section. There is no attempt to close the top and ends, these being filled later with potting material. The case is dimensioned to snugly receive the stack of cells and plates, and the face area of the case is somewhat larger than that of the stack, in order to provide room for peripheral potting material shown at 56 and 58 in FIG. 4, and at 60 and 62 in FIG. 5. The case preferably is made of aluminum for good heat conductivity. The grade selected may be one having some resilience, in this case 52–S, and the sides are initially formed in converging relation, as shown in FIG. 3, so that the case exerts some compression force on the stack of cells and plates.

A piece of insulation 64 is preferably disposed at the bottom of the stack. This is simply a strip of fiber insulation material, and it is initially bowed an amount greater than its final dimension, so that it is held frictionally in position when the stack is inserted in the case. Later it is embedded in the potting material.

A band of insulating tape, preferably "Mylar," is applied to the upper portion of the case, as shown at 66 in FIGS. 1, 2 and 4. The tape is an adhesive tape which overlaps at 68. It is preferably applied with its top edge 70 somewhat higher than the top of the case, as is clearly shown in FIG. 4, and makes it possible for the potting material to cover the top edges of the metal case.

During the potting operation an ordinary inexpensive pressure-sensitive masking tape is applied around the open edges of the case to temporarily hold the potting material until it sets. The potting material is preferably an epoxy material which is thick enough not to penetrate between the cells and plates. Instead it fills only the periphery of the case.

The "Mylar" masking tape is preferably applied tightly, and has the advantage of holding the sides of the aluminum shield together so that it will not relax its resilient grip on the assembly of plates. It also lengthens the leakage path between the outwardly projecting soldering lugs, on the one hand, and the grounded exterior of the metal case. This is in addition to providing a filling of potting material above the top edges of the metal case, which edges if exposed, would minimize the leakage path.

The preferred method of assembling the parts of the rectifier assembly in bridge formation may be described as follows. Four cells are placed in a pile, two cells face up, and two cells face down, to provide a bridge configuration with two cells opposing two cells. One terminal is slipped between the bottom cell and the cell above it, with the terminal lug or tab positioned on the right side. Another terminal is slipped between the two center cells with the terminal tab positioned on the left side. A third terminal, with a somewhat differently located tab, is slipped between the top cell and the cell below it, with the terminal tab positioned on the right side.

The build-up of cells and terminals is now squared off as evenly as possible and then inserted into the case. The assembly should be so positioned in the case that the cells and terminals are flush with the top or open end of the case, and centered in the case from side to side. The fibre bottom piece 64 is slid into position.

"Mylar" tape is now applied around the top of the case, the tape extending somewhat beyond the top edge of the case. The case is pressed firmly during the taping, in order to produce a tight assembly.

Before potting the assembly, common masking tape is used to envelop the ends of the case. The masking tape is applied starting at the "Mylar" tape area and running down under the bottom of the case, to insure that no potting material will leak out.

Sufficient epoxy potting material is applied to reach the level of the top edge of the "Mylar" tape. When the potting material has cured, the masking tape is removed. The unit is then ready for testing and marking.

In one typical example the unit is 2 3/16 inches high, 2 1/4 inches wide and 9/32 of an inch thick. In bridge form the rectifier operates at 26 volts and 6 amperes. In another typical example it is 2 13/16 inches high, 2 15/16 inches wide, and 9/32 of an inch thick, and operates at 26 volts and 10 amperes. This assumes a heat sink having a moderate area of say forty square inches.

In the latter rectifier the cells are 2.6 inches square with a thickness of 0.035 inch. The selenium alloy coating has a minimum thickness of 0.002 inch, and the alloy coated area is somewhat less than the metal area, in this case leaving an uncoated border of 0.098 inch wide. The terminal plates are preferably made of electrotinned brass, and should have no burrs or sharp edges. The thickness is 0.020 of an inch. The case is made of 52–S grade aluminum having a thickness of 0.032 of an inch. The "Mylar" tape has a width of 1/2 inch. The fiber insulator at the bottom has a width of 0.188 of an inch and a thickness of 0.055 of an inch, and is initially bent to a rise of 3/8 of an inch, although in final position it has a rise of only 1/8 of an inch.

It will be understood that the quantitative dimensions given above are given solely by way of example, and not intended to be in limitation of the invention.

In FIGS. 6 and 7 the selenium coated sides of the cell would face inward, and would correspond to the pointed sides of the triangles in FIG. 6. The case 18 then is the negative terminal, which is customary for grounding purposes. In FIG. 3 the coated sides are shown facing outward, and the outer casing 18 then is the positive terminal. This is less usual, but FIG. 3 has been drawn in that fashion in order to better show the selenium coating which distinguishes the cells from the terminal plates.

In FIG. 3 the stippling terminates short of the edge of the cell. In practise the selenium coating may extend to the edge of the cell, although an alloy on top of the selenium coatng may terminate a little short of the edge as suggested in FIG. 3.

The tape 66 has been referred to as a "Mylar" tape, which has the advantage of lengthening leakage path. However, if this lengthening of the leakage path is not needed, any ordinary masking tape may be used during the potting operation, and may be removed after the potting material has solidified. Removal of the tape improves the contact between the rectifier case and the heat sink on which it is mounted. One advantage of "Mylar" tape is that it is extremely thin and does not significantly increase the spacing between the rectifier case and the heat sink.

It is believed that the construction and method of assembly and use, as well as the advantages of my improved flat rectifier stack, will be apparent from the foregoing detailed description. The rectifier is exceedingly compact, and is well protected against adverse atmospheric conditions and vibration. It is therefore well suited for use as a full wave rectifier for outboard marine engines, to rectify the output of an alternator for battery charging purposes. The structure also may be used for single-phase half wave and center tap circuits, and for a three-phase half wave circuit. The rectifier is capable of taking nonrepetitive surges of ten times the normal current for very brief periods. The parts are all simple stampings which may be punched out of sheet material, and no complex molded spacers are needed. Substantially the full area of the device is used for rectifier action, and cooling is obtained by conducting heat to a frame or chassis which is anyway present, and which is here employed as a heat sink.

It will be understood that while I have shown and described the invention in a preferred form, changes may be made in the structure shown without departing from the scope of the invention, as sought to be defined in the following claims.

I claim:

1. A flat rectifier assembly comprising a plurality of flat selenium cells, each cell having a base plate and a selenium coating surface thereon, a plurality of flat metal terminal plates each having a pair of opposite side contact surfaces and an upwardly projecting soldering lug at its upper edge, said cells and terminal plates being stacked with at least two of said contact surfaces of said terminal plates in contact with two selenium surfaces of said cells, a sheet metal case bent to U shape and having parallel sides and a web portion connecting said sides, said stack of selenium cells and terminal plates disposed within said case with an edge thereof parallel to and spaced from said web and having the respective flat surfaces of the end members of said stack engaging the inner surfaces of the sides of the case in a snug fit, and with said soldering lugs projecting laterally from the case, and the sides of the case having margins extending over the respective edges of the cells and plates in said stack and together with the peripheral edges of the stack forming a trough around the peripheral sides of the case and stack, and a polymerized insulative potting compound filling the trough and covering the peripheral edges of the cells and plates with the soldering lugs projecting through and exposed on the exterior side of the compound.

2. A flat rectifier assembly as defined in claim 1, in which there are four selenium cells and three terminal plates, and in which two cells face in one direction and the other two in opposite direction, and in which the cells and terminal plates are disposed in alternation, and in which the metal case contacts the outer faces of the outer cells, whereby the stack may be used as a full-wave rectifier of the bridge type.

3. A flat rectifier assembly as defined in claim 1, in which there are four selenium cells and three terminal plates, and in which two cells face in one direction and the other two in opposite direction, and in which one terminal plate is disposed between the two opposing middle cells, and in which the other plates are disposed outside the outer cells, and in which the metal case is lined with insulation, the resulting three terminals adapting the stack for use as a center tap rectifier assembly.

4. A flat rectifier assembly as defined in claim 1, in which there is a band of insulating tape around the top edge of the casing remote from the web and around the soldering lugs, with the upper edge of the tape disposed somewhat higher than the upper edge of the case, and in which the potting compound fills the hollow provided by said tape.

5. A flat rectifier assembly as defined in claim 1, in which the base plates of the selenium cells are aluminum and square in configuration, and in which the terminal plates are made of brass and have rounded corners, and in which the potting compound is an epoxy compound.

References Cited in the file of this patent

UNITED STATES PATENTS

| | | |
|---|---|---|
| 1,768,441 | Dubilier | June 24, 1930 |
| 2,482,817 | Vitrogan | Sept. 27, 1949 |
| 2,656,493 | Conant | Oct. 20, 1953 |
| 2,999,963 | Schneider | Sept. 12, 1961 |

FOREIGN PATENTS

| | | |
|---|---|---|
| 877,292 | Great Britain | Sept. 13, 1961 |
| 1,123,049 | Germany | Feb. 1, 1962 |